United States Patent [19]

Sedlmeier

[11] Patent Number: 5,480,067
[45] Date of Patent: Jan. 2, 1996

[54] COMPOSITE FOIL HOSE-SHAPED BAG

[75] Inventor: Andreas Sedlmeier, Ummendorf, Germany

[73] Assignee: Hilti Aktiengesellschaft, Schaan, Liechtenstein

[21] Appl. No.: 227,416

[22] Filed: Apr. 14, 1994

[30] Foreign Application Priority Data

Apr. 14, 1993 [DE] Germany .......................... 43 12 192.6

[51] Int. Cl.$^6$ ..................................................... B65D 35/08
[52] U.S. Cl. ........................ 222/107; 222/541.6; 383/202
[58] Field of Search ................................ 222/81, 83, 107, 222/541, 541.6; 383/66, 202, 207

[56] References Cited

U.S. PATENT DOCUMENTS

| | | | |
|---|---|---|---|
| 3,477,614 | 11/1969 | Runge | 222/107 |
| 3,661,322 | 5/1972 | Norman | 222/107 |
| 4,072,233 | 2/1978 | Kramer et al. | 383/202 |
| 5,035,348 | 7/1991 | Seifert | 222/107 |
| 5,310,262 | 5/1994 | Robison et al. | |

FOREIGN PATENT DOCUMENTS 3826887  2/1990  Germany ................................ 222/83

*Primary Examiner*—Andres Kashnikow
*Assistant Examiner*—Philippe Derakshani
*Attorney, Agent, or Firm*—Anderson Kill Olick & Oshinsky

[57] ABSTRACT

A hose-shaped bag (1) is formed of a composite foil made up of a metal foil (3c) and at least one plastic foil (3a) arranged as an outer layer on an outer surface of the metal foil (3c). A weakened location is provided in the outer plastic foil (3a) produced by a thermal heat effect and affording a rated failure location. The weakened location reduces the overall mechanical strength of the composite foil (1), so that an opening member on a dispensing tool can reliably open the hose-shaped bag at this location.

5 Claims, 2 Drawing Sheets

COMPOSITE FOIL HOSE-SHAPED BAG

BACKGROUND OF THE INVENTION

The present invention is directed to a hose-shaped bag formed of a composite foil including a metal foil and at least one outer plastic foil in contact with the outer surface of the metal foil. Hose-shaped bags of this type are used mainly for storing curable or hardenable masses, in particular multi-component masses, such as mortar masses and the like.

After filling with a component of a mass, the hose-shaped a bag is closed, for instance, by welding or by sealing its ends with sealing clips formed of metal.

In the filled state, the hose-shaped bags are inserted in dispensing tools where the mass is squeezed or pressed out to process it, and the hose-shaped bags are emptied by a compressing and squeezing action on the bags by parts of the tool. To commence the dispensing operation, it is necessary to open the hose-shaped bags.

Various ways are known for opening the hose-shaped bags. It is known to cut the hose-shaped bags open by a special cutting device before the bag is introduced into a dispensing tool.

Such an opening procedure has the disadvantage that the mass can escape from the hose-shaped bag immediately after it is cut open resulting in fouling or contamination of the dispensing tool as well as its surroundings.

For this reason, it is a widely accepted procedure to equip the dispensing tool with an opening member, such as a puncture pin or a puncture edge. The cooperation of such an opening member with a hose-shaped bag inserted into the dispensing tool is intended to assure that the bag is opened while in the tool, which, with a suitable design, can take place after the tool has been closed.

In actual practice it has been found that the above-mentioned preferred method of opening hose-shaped bags involves certain difficulties and does not always lead to the desired result. This occurs because composite foils, used as the material in hose-shaped bags, have a relatively high mechanical strength.

As an example, composite foils are made up of one or more plastic foils as well as one or, if necessary, several metal foils. This layered construction of composite foils is arranged for protection against chemical influences with a plastic foil layer forming the outside surface of the bag.

Preferably, polyurethane, as the plastic material, and aluminum, as the metal material, are used in forming composite foils. The high mechanical strength or resistance required for composite foils both for storage and transport has disadvantages in opening the hose-shaped bag. Often, the opening members in the dispensing tool are insufficient to overcome the mechanical strength of the composite foil and fail to open the hose-shaped bag at the desired time and location.

SUMMARY OF THE INVENTION

Therefore, it is the primary object of the present invention is to provide a hose-shaped bag assuring a reliable opening of the bag in cooperation with the opening members in dispensing tools.

In accordance with the present invention, the external plastic foil of the composite foil is provided with a weakened region provided by thermal or heat action for forming a rated failure location. The weakened region produced by thermal or heat action reduces the mechanical strength of the hose-shaped bag at a specific location. This location is selected so that it aligns with the opening member of the tool. As a result, a reliable opening at the desired time and at the intended location is assured in cooperation with the opening member of the tool while maintaining the overall mechanical strength of the bag.

Depending on the thickness and the character of the outer foil, for instance, the degree of chemical action, the required time period, and temperature can be adapted. Because of the metal foil present in the composite foil, the thermal action is interrupted at the metal foil by corresponding heat dissipation, therefore, the weakened region extends only between the outer surface of the bag and a metal foil, without including the metal foil or other additional plastic foils located inwardly of the metal foil.

Based on the type of opening member in the tool, the weakened region can be point-shaped, line-shaped, or annularly shaped. By point-shaped it is also meant to include a certain surface area.

The thermal effect can be provided inductively or directly by means of electrodes, wherein the electrodes used can be adapted to the form of the weakened region.

Instead of using a separate electrode, it is possible to utilize the sealing clip which serves to seal the hose-shaped bag, if the clip if formed of metal. In such a case, the sealing clip can be heated by induction and the weakened region located in preferred manner in the area of the sealing clip.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there is illustrated and described a preferred embodiment of the invention.

DETAILED DESCRIPTION OF THE INVENTION

Figure 1:
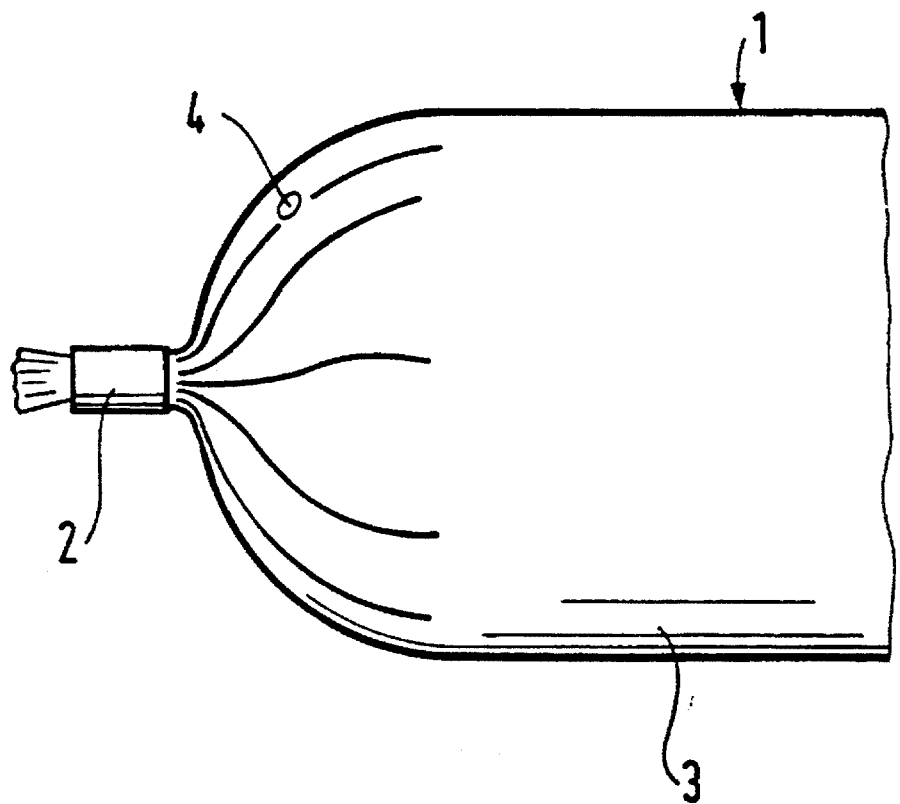
FIG. 1 is a side view of the end portion of a hose-shaped bag including the weakened region of the present invention.
Figure 2:
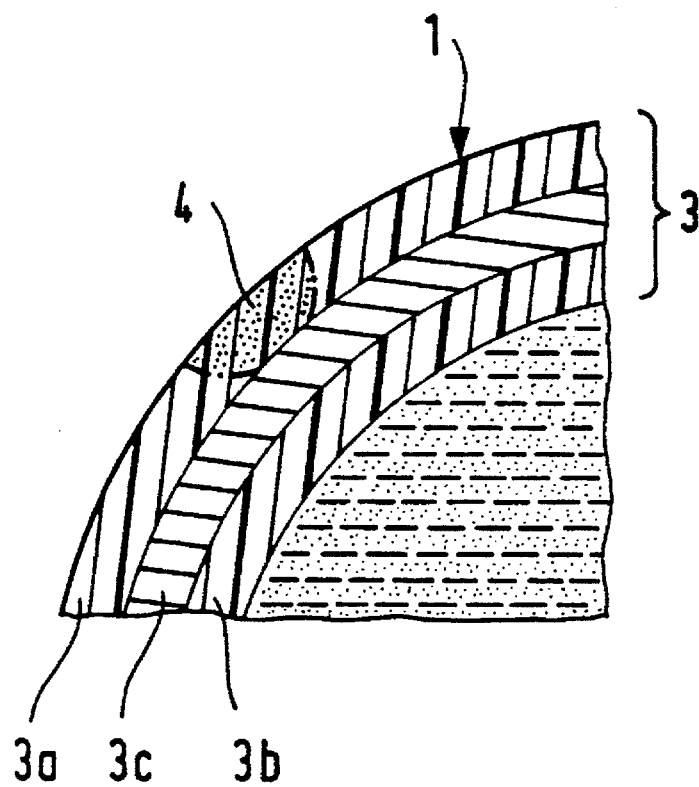
FIG. 2 is an enlarged sectional view of the composite foil forming the hose-shaped bag in FIG. 1 and illustrating the weakened region.
Figure 3:
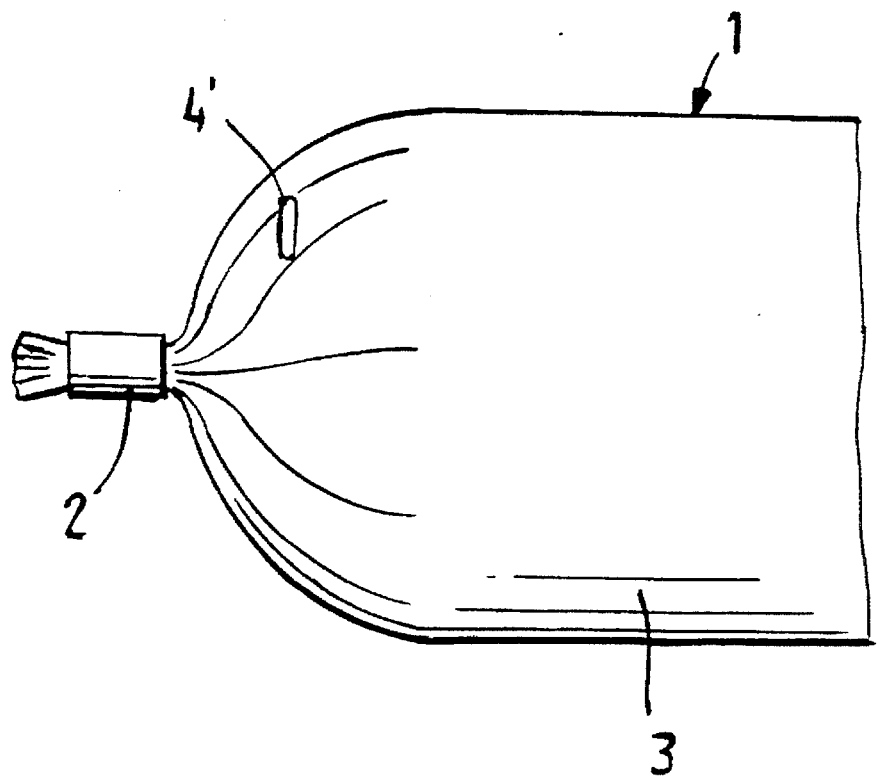
FIG. 3 is a side view of the end portion of a hose-shaped bag including a line-shaped weakened region of the present invention.
Figure 4:
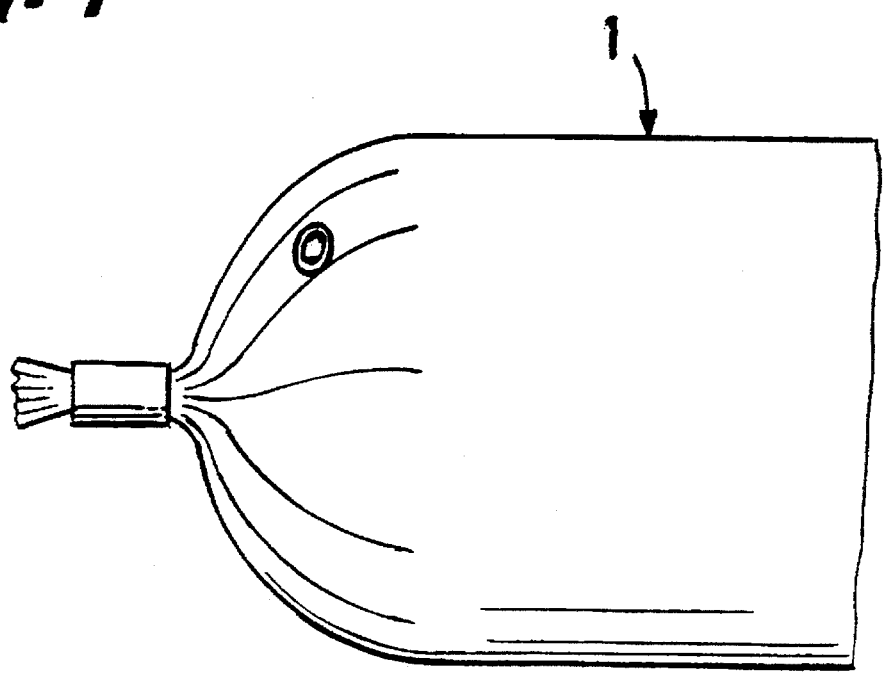
FIG. 4 is a side view of the end portion of a hose-shaped bag including an annular shaped weakened region of the present invention.

In FIG. 1 an end region of the hose-shaped bag 1 is shown closed by a sealing clip 2. The hose-shaped bag 1, as illustrated in FIG. 2, is formed of a composite foil 3 with a weakened location or area 4 close to the sealing clip 2. The weakened location 4 is arranged at an end face of the bag 1, so that, if necessary, it can cooperate with an opening member of a dispensing tool, not shown, such as a puncture pin.

In FIG. 2 there is an enlarged sectional showing of the composite foil 3 forming the hose-shaped bag 1. This figure displays the weakened location 4 which has been produced by thermal action.

As displayed clearly in FIG. 2, the composite foil 3 is made up of several foils or layers of foils contacting one another, for example, an outer plastic foil 3a, an inner plastic foil 3b and a metal foil 3c interposed between and in contact with the plastic foils.

As set forth in FIG. 2, the weakened location 4 is positioned only in the outer plastic foil 3a and has been terminated during fabrication by corresponding heat dissipation at the metal foil 3c. As a result, neither the metal foil 3c nor the inner plastic foil 3b has been weakened by the thermal heat effects. In this way, the mechanical strength of the composite foil 3 has been reduced in the weakened location 4 by the strength of the outer plastic foil 3a.

Opening the hose-shaped bag 1 by an opening member in the dispensing tool is facilitated at the weakened location.

While a specific embodiment of the invention has been shown and described in detail to illustrate the inventive principles, it will be understood that the invention may be embodied otherwise without departing from said principles.

I claim:

1. A hose-shaped bag (1) is formed of a composite foil (3) including a metal foil (3c) and at least one outer plastic foil (3a) located on an outer surface of the metal foil (3c), wherein the improvement comprises a weakened location (4) of reduced mechanical strength produced by a thermal effect and forming a rated failure location for said bag, the weakened location being formed only in said outer plastic foil (3a) and terminating at the outer surface of the metal foil (3c).

2. A hose-shaped bag, as set forth in claim 1, wherein said weakened location (4) is point-shaped.

3. A hose-shaped bag, as set forth in claim 1, wherein said weakened location (4) is line-shaped.

4. A hose-shaped bag, as set forth in claim 1, wherein said weakened location (4) is annularly shaped.

5. A hose-shaped bag, as set forth in any one of claims 1, 2, 3 or 4, wherein said bag has an end closed by a sealing clip (2), and said weakened location (4) is located adjacent said sealing clip (2).

* * * * *